(12) United States Patent
Alzaher

(10) Patent No.: US 9,077,585 B2
(45) Date of Patent: Jul. 7, 2015

(54) FULLY INTEGRATED DC OFFSET COMPENSATION SERVO FEEDBACK LOOP

(71) Applicants: KING FAHD UNIVERSITY OF PETROLEUM AND MINERALS, Dhahran (SA); KING ABDULAZIZ CITY FOR SCIENCE AND TECHNOLOGY, Riyadh (SA)

(72) Inventor: Hussain Alzaher, Dhahran (SA)

(73) Assignees: KING FAHD UNIVERSITY OF PETROLEUM AND MINERALS, Dhahran (SA); KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 211 days.

(21) Appl. No.: 13/737,915

(22) Filed: Jan. 9, 2013

(65) Prior Publication Data

US 2014/0192844 A1     Jul. 10, 2014

(51) Int. Cl.
*H04B 1/38*     (2006.01)
*H04L 25/06*     (2006.01)

(52) U.S. Cl.
CPC .................................. *H04L 25/063* (2013.01)

(58) Field of Classification Search
CPC ....................................................... H04L 25/06
See application file for complete search history.

(56) References Cited

U.S. PATENT DOCUMENTS

| | | | |
|---|---|---|---|
| 7,403,760 B1 | 7/2008 | Gao | |
| 2005/0110550 A1* | 5/2005 | Shi et al. | 327/307 |
| 2005/0232101 A1* | 10/2005 | Hasegawa | 369/47.1 |
| 2006/0223472 A1 | 10/2006 | Bagchi et al. | |
| 2007/0237264 A1 | 10/2007 | Huang et al. | |
| 2008/0140755 A1 | 6/2008 | Remy et al. | |
| 2009/0016544 A1* | 1/2009 | Li et al. | 381/94.1 |
| 2011/0207418 A1* | 8/2011 | Laroia et al. | 455/75 |

* cited by examiner

*Primary Examiner* — Edward Urban
*Assistant Examiner* — Mohammed Rachedine
(74) *Attorney, Agent, or Firm* — Richard C. Litman

(57) ABSTRACT

The fully integrated DC offset compensation servo feedback loop is an integrator that measures the output signal DC component, and then feeds back and subtracts the measured DC component from the input signal. A larger integrator time constant lowers the high pass corner frequency, which must be very small in order to minimize the loss of the low frequency component of the desired signals. The large time constant is achieved on an integrated circuit by the use of a class-AB fully differential opamp in conjunction with an R-2R ladder as a circuit element to accomplish an integrated large time constant integrator. The R-2R ladder is configured as a digitally programmable resistor.

1 Claim, 6 Drawing Sheets

FULLY INTEGRATED DC OFFSET COMPENSATION SERVO FEEDBACK LOOP

BACKGROUND OF THE INVENTION

1. Field of the Invention

The present invention relates to circuits for radio frequency transmitters, receivers, and transceivers, and particularly to a fully integrated DC offset compensation servo feedback loop utilizing R-2R resistance elements that corrects for an unwanted DC component that may be mixed with signals in the transmitter, receiver, or transmitter.

2. Description of the Related Art

Bioinformatics institutes, which host large public collections of molecular biology databases, rely on fast and secure transmission of large amounts of biological data between their servers and their many partners around the world. Some of these partners may be in remote areas, forcing them to employ wireless data transfer. Also, the design of high-quality implantable miniature devices to transmit real-time physiologic parameters from a patient's body to a bioinformatics server is another important task for wireless communications. Such implantable devices are expected to deliver a high level of comfort, mobility, and better patient care. In order to replace the low-frequency inductive coupling techniques in implantable devices, the U.S. Federal Communication Commission (FCC) has recently assigned the 402-405 MHz band with 300 kHz bandwidth channels for medical implant communication service.

This band is expected to facilitate full integration, reduce power consumption, enhance data transfer, and support longer communication range. Also, the metrological aids service has a primary allocation at the 402-405 MHz band for medical implants. In addition, it has a secondary allocation at 402-403 MHz for the Earth exploration-satellite service, together with the metrological-satellite service.

In fact, penetration loss increases with higher frequencies, but it facilitates high-level integration. Fortunately, the penetration loss at these frequencies is relatively insignificant (10 dB with 10 mm tissue penetration), and hence it is inherently compatible with medical implant devices. Also, operation in this frequency range, unlike lower frequencies, promotes small antenna design. The availability of the 402-403 MHz band, internationally accompanied with these advantages, makes this frequency band an attractive choice for the future of medical implant devices.

The use of wireless transmission of biological data between servers and partners and the design of a high-quality implantable miniature devices to transmit real-time physiologic parameters (e.g., ECG, EEG, EOG, EMG, Neural, Blood Flow, Blood Pressure, etc.) from a patient body could be the key point in saving the patient's life. Such implantable devices are expected to deliver a high level of comfort, mobility, and better patient care. The transceivers in such devices often suffer from a DC offset problem, which could reduce the overall dynamic range and even saturate systems at high gain levels. Adaptive digital signal-processing techniques, along with digital-to-analog converters (DAC's), which are typically used in wireless communications, may not be adopted in biomedical applications due to power inefficiency.

Thus, a fully integrated DC offset compensation servo feedback loop solving the aforementioned problems is desired.

SUMMARY OF THE INVENTION

The fully integrated DC offset compensation servo feedback loop is an integrator that measures the output signal DC component, which is then fed back and subtracted from the input signal. A larger integrator time constant lowers the high pass corner frequency, which must be very small in order to minimize the loss of the low frequency component of the desired signals. The large time constant is achieved on an integrated circuit by the use of a class-AB fully differential opamp (operational amplifier) in conjunction with an R-2R ladder as a circuit element to accomplish an integrable large time constant integrator. The R-2R ladder is configured as a digitally programmable resistor.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
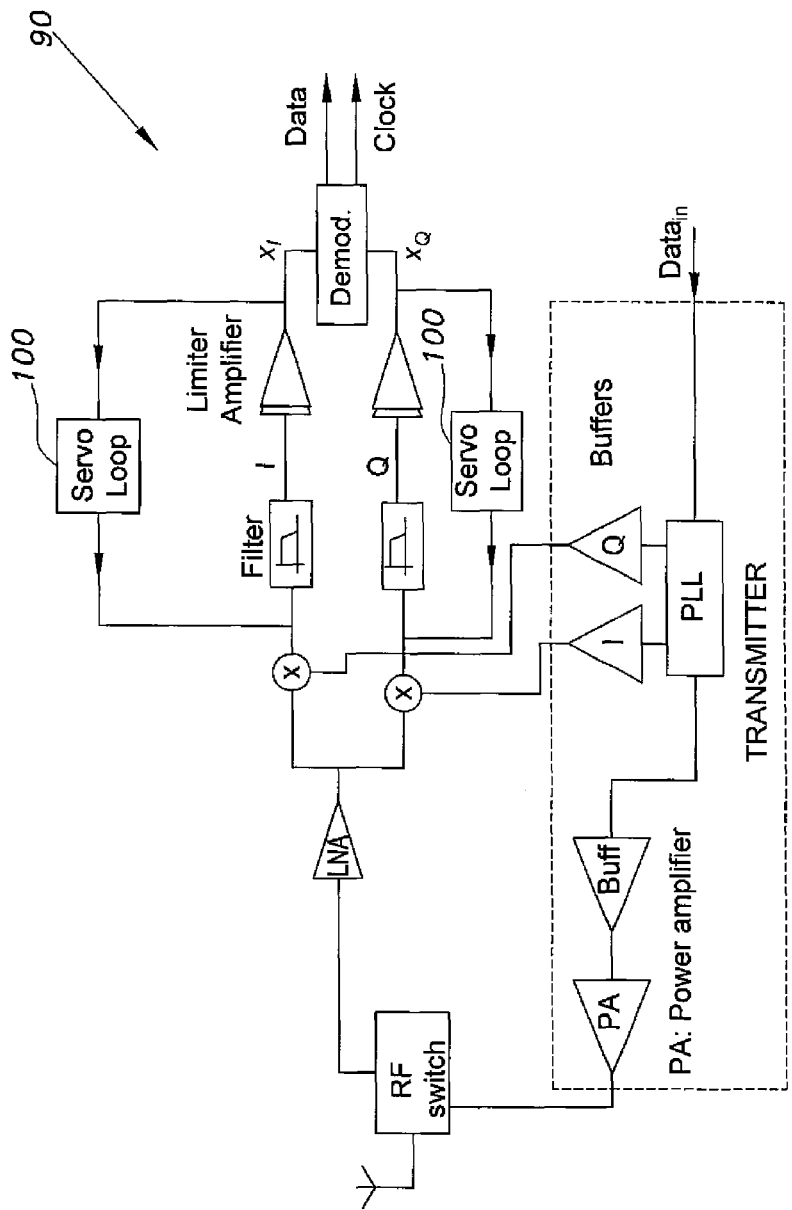
FIG. 1 is a block diagram of a typical direct conversion frequency-shift-keyed (FSK) transceiver supporting low power implementation.

As shown in FIG. 1, the fully integrated DC offset compensation servo feedback loop 100 is incorporated in a direct conversion frequency-shift-keyed (FSK) transceiver 90 supporting low power implementation. A half-duplex communication system (i.e., it receives and transmits at different times) is adopted. The Phase-Locked Loop (PLL) is opened in the transmit mode of the architecture, and hence the baseband digital data directly modulate the VCO (voltage-controlled oscillator) with an offset tone of $\pm\Delta f=70$ kHz. This results in optimal selection of one of ten 300 kHz channels. In the receive mode, the VCO is a subpart in the PLL loop. The technique can easily be used for other modulation schemes as well (e.g., amplitude modulation, frequency modulation and phase modulation and others). However, direct modulation of VCOs for FSK signals is advantageous due to the relaxed bandwidth requirements per channel (20 kb/s maximum data rate). An FM-modulated signal will be produced when the input to the VCOs is analog data.

Figure 4:
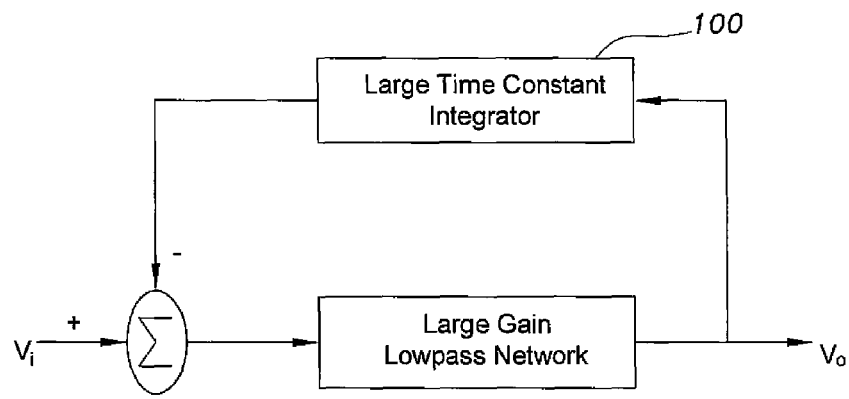
FIG. 4 is a high level block diagram showing the functionality of a fully integrated DC offset compensation servo feedback loop according to the present invention.

A conceptual block diagram demonstrating the operation of the servo loop is shown in FIG. 4. The function of the servo loop 100 is to introduce a DC notch in the low pass system transfer function, eliminating the DC offset at its output. An integrator measures the output signal DC component, which is fed back and subtracted from the input signal. Proper operation of the servo loop 100 requires the implementation of an integrator having a large time constant. A larger integrator time constant lowers the high pass corner frequency, which must be very small in order to minimize the loss of the low frequency component of the desired signals. This requires an integrator with large capacitor and resistor values, which cannot practically be implemented on an integrated circuit chip. The servo loop 100 overcomes this practical implementation problem.

Figure 3:
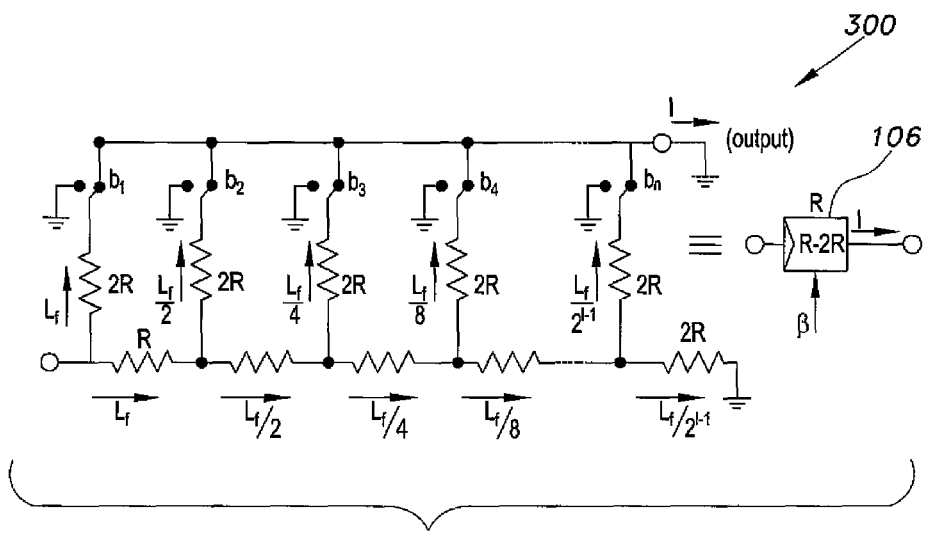
FIG. 3 is a schematic diagram of the R-2-R ladder circuit employed in the servo feedback loop of FIG. 2.

The servo feedback loop 100 is used for DC offset cancellation in this system. The servo feedback loop 100 is designed around the baseband filter and is efficiently employed to compensate for the DC offset associated with self-mixing in the radio front end, as well as that generated in the baseband circuits. To overcome the typical servo loop requirement of using very large capacitor and/or resistor values that are unsuitable for integration into an IC chip circuit, the present servo loop 100 utilizes the R-2R ladder 300 (shown in FIG. 3) as a circuit element 106 to design an integrable large time constant integrator. The R-2R ladder circuit element 106 is configured as a digitally programmable resistor. Its equivalent resistance, seen between the input and output nodes, is given by:

$$R_{eq} = \frac{V}{I} = \beta R \tag{1}$$

where $$\beta = \frac{1}{\sum_{i=1}^{n} \frac{b_i}{2^i}}.$$

Therefore, a large equivalent resistance can be achieved using a relatively very small passive resistance. For example, when $b_i=0$ for $i=1, 2, \ldots, n-1$ and $b_n=1$, an n-bit R-2R ladder exhibits a large equivalent resistance of $(2^n)R\Omega$. while actually requiring total resistance of only $(3n+1)R\Omega$. By replacing the passive resistor in the well-known opamp integrator by an R-2R ladder, the transfer function becomes:

$$\frac{V_o}{V_i} = -\frac{1}{sCR\beta} \tag{2}$$

The time constant of the integrator determines the DC notch highpass corner frequency and the speed of the servo loop. Since the settling time of the servo loop is inversely proportional to the highpass corner frequency, the digital programmability feature of the proposed integrator becomes advantageous. For example, the digital signal processing (DSP) part of the receiver can be utilized to directly program the servo loop settling time to achieve a certain bit error rate (BER). The highpass corner frequency can be shifted down to achieve better BER or up to accelerate the loop settling time, which is particularly important for time division multiple access (TDMA) receivers. However, when the loop is designed for a specific BER or settling time and when programmability is not needed, the switches of the R-2R ladder may be removed. For instance, directly connecting the least significant 2R resistor to the opamp virtual ground and all other shunt 2R resistors to ground, the integrator original time constant is multiplied by a factor of $2^n$ and a minimum highpass corner is achieved.

Figure 2:
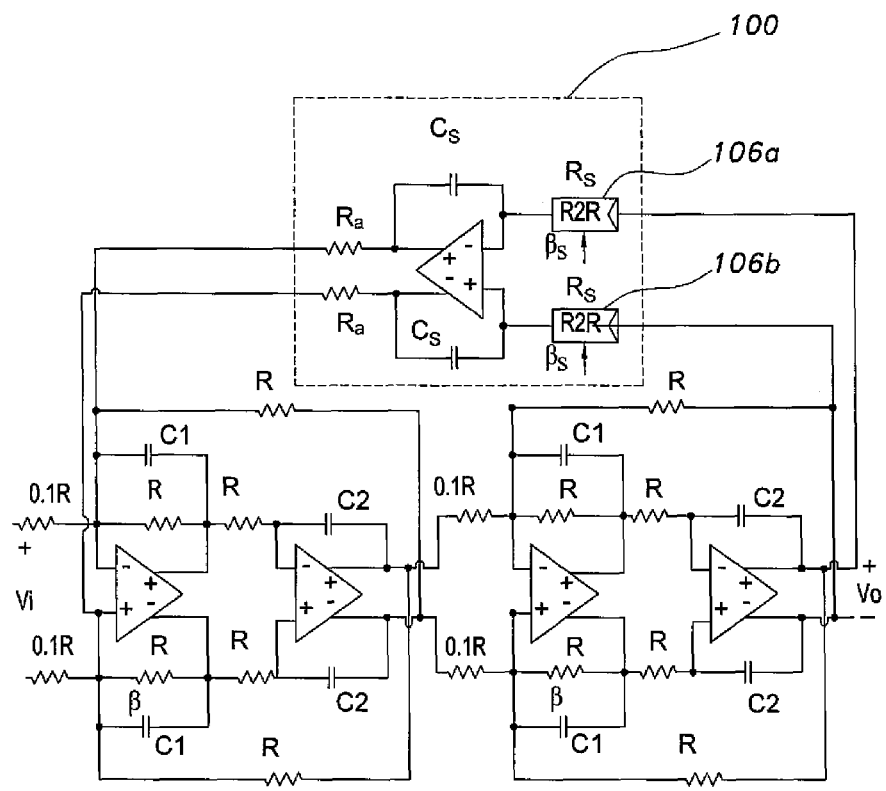
FIG. 2 is a schematic diagram of a fully integrated DC offset compensation servo feedback loop according to the present invention for use in the transceiver of FIG. 1, shown with a testing circuit.

To demonstrate the operation of the proposed servo loop, the circuit shown in FIG. 2 was laid out in a 0.18 μm standard CMOS technology. The servo loop 100 is used to introduce a DC notch in the fourth-order low pass filter obtained by cascading two Tow-Thomas fully differential biquads. R-2-R ladders 106a and 106b each have a control input $\beta_s$ that individually programs that R-2-R ladder's total resistance. The servo loop occupies an area of 0.048 mm² using $C_s=50$ pF capacitors (65% of the area) and 10-bit R-2R ladder circuit elements 106a and 106b with $R_s=15$ KΩ. Subtraction of the integrator output signal from the input signal is simply performed by resistors $R_\alpha$ utilizing the virtual ground property of the operational amplifier at the input port.

Figure 6:
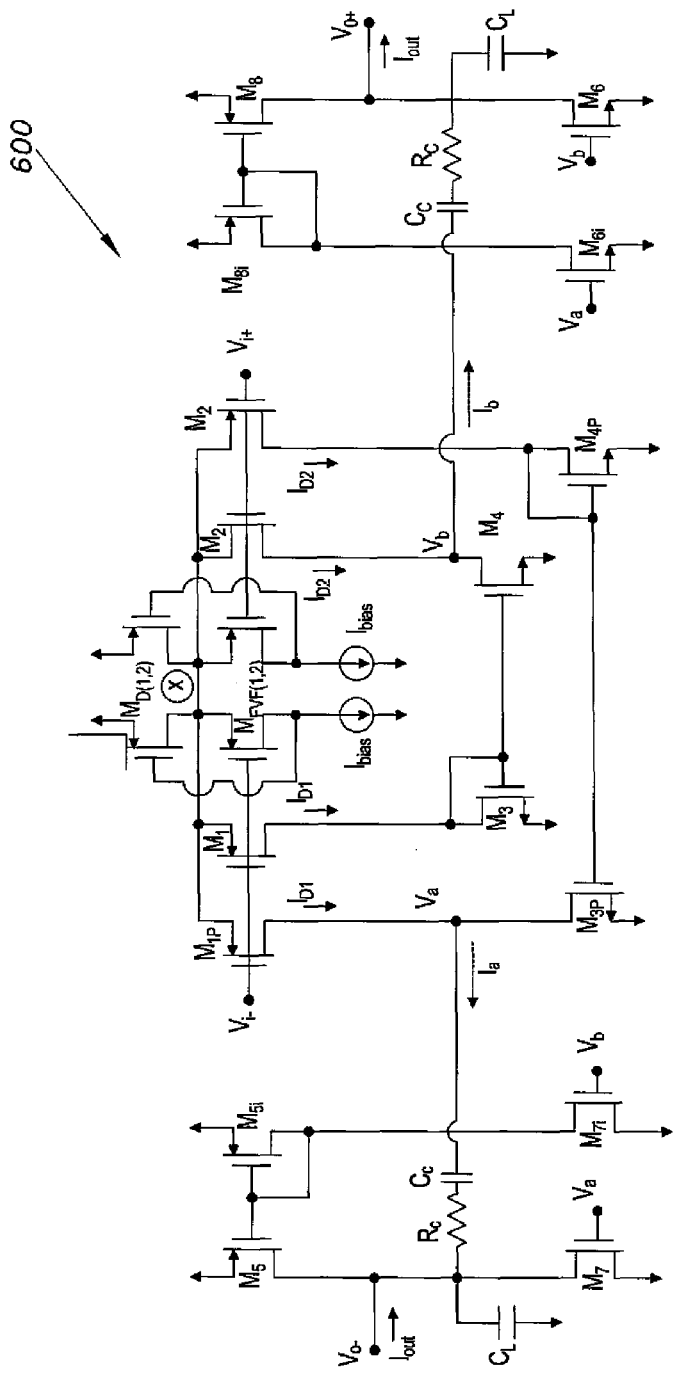
FIG. 6 is a schematic diagram of a two-stage class-AB operational amplifier employed in the servo feedback loop of FIG. 2.

The exemplary operational amplifier portion of the servo loop 100 is a class-AB fully differential opamp 600, as shown in FIG. 6, and was employed for low power operation and good output current driving capability, which enhances the speed of the servo loop 100. The opamp 600 was simulated using supply voltages of ±0.25V. The opamp 600 was optimized to achieve at least 80 dB gain with minimum biasing current, while deriving load capacitances of 50 pF and resistances of 30 kΩ. This load represents the stringent load ($C_s$ and ladder of $R_s$) derived by the servo loop opamp. The optimization process has resulted in a gain of 86 dB when the opamp is biased with a total current of 1 nA, leading to a total current of 26 nA. The opamp is compensated to have a phase margin of better than 65°, resulting in a unity gain frequency ($f_t$) of 50 kHz.

Figure 7:
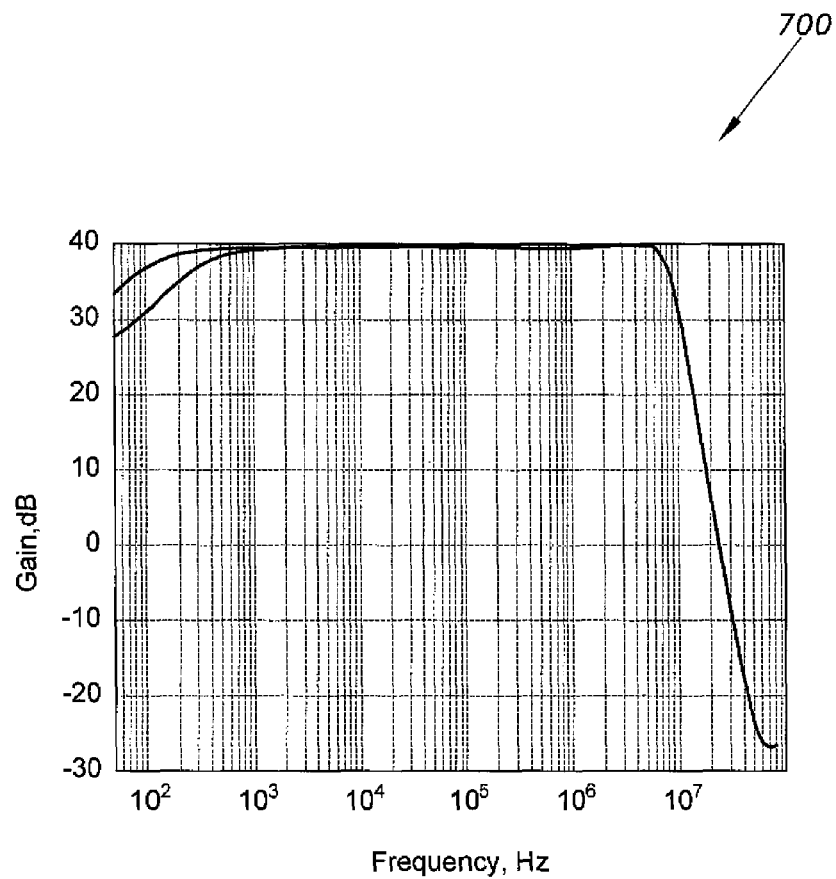
FIG. 7 is a plot showing transient response comparisons of simulations of the fully integrated DC offset compensation servo feedback loop according to the present invention.

Simulated results include the frequency response shown in plot 700 of FIG. 7. The total standby power of the servo loop is about 13 nW, while occupying an area of less than 0.05 mm². Simulation results obtained by using both 10-bit and 8-bit R-2R ladders are included. DC notches with high pass corner frequencies of approximately 100 Hz and 310 Hz are achieved for n=10 and n=8, respectively.

Figure 5:
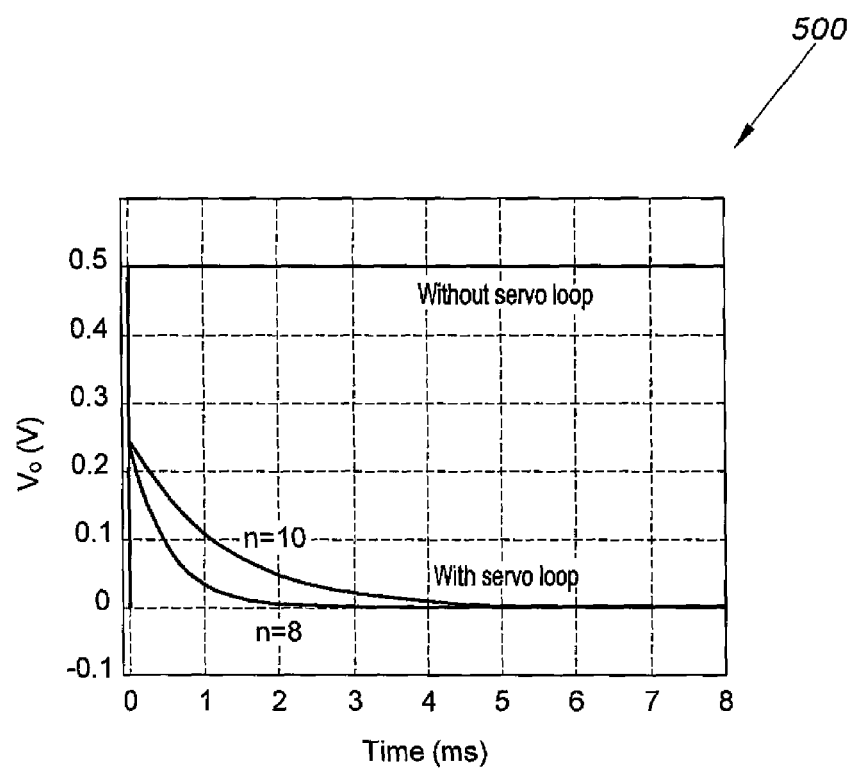
FIG. 5 is a plot showing transient response comparisons of the fully integrated DC offset compensation servo feedback loop according to the present invention.

Plot 500 of FIG. 5 shows the transient response of the circuit with an input DC offset of 30 mV. It can be seen that without the servo loop, the large DC gain saturates the circuit. However, by introducing the servo loop, the DC offset is cancelled. The loop reduces the output DC offset to less than 10 mV in 6.5 ms for n=10, and in 2.1 ms for n=8, as shown in transient response plot 500 of FIG. 5. Moreover, simulation results using n=10 show that the value of the servo loop capacitor (Cs) can further be reduced to about 5 pF (0.8 pF), and the settling time decreases to 690 μs (140 μs) if the required DC notch is increased to 2 kHz (20 kHz).

Advances of radio frequency IC (RFIC) technology are expected to achieve high-level integration (compared to inductive link designs), leading to miniaturization and low power consumption for MICS. Aligning with this, the proposed work has presented a design of a fully integrated analog DC cancelation scheme exhibiting low power consumption. This scheme will be an important part in the wireless implantable devices operating in the MICS service band. Also, it may be adopted for glucose-insulin control of diabetes patients under intensive care.

The fully integrated DC offset compensation servo feedback loop 100 utilizes R-2R ladder networks 300, which perform as circuit elements 106 to promote the implementation of an ultra-large time constant in relatively small area. In the evaluation, the results obtained through the simulation showed that the design is effective and the results are encouraging.

It is to be understood that the present invention is not limited to the embodiments described above, but encompasses any and all embodiments within the scope of the following claims.

I claim:

1. A transceiver with servo feedback loops for compensating for DC offset in transmitted and received signals, comprising:

a direct conversion frequency-shift-keyed (FSK) transceiver, the transceiver having a front end modulating and demodulating signals when transmitting and receiving signals, the front end having a fourth-order low pass filter for transmitted signals and a fourth-order low pass filter for received signals, the front end mixing an unwanted DC offset component onto the transmitted and received signals; and a first servo feedback loop connected across the fourth-order low pass filter for transmitted signals and a second servo feedback loop connected across the fourth-order low pass filter for received signals, each of the servo feedback loops having a differential dual operational amplifier integrated circuit configured as a differential integrator, each of the operational amplifiers in the integrated circuit having an RC circuit connected thereto, each of the RC circuits having a digitally programmable R-2-R ladder forming the resistive component of the RC circuit, wherein each said differential dual operational amplifier integrated circuit comprises a class-AB fully differential operational amplifier circuit; and wherein the differential intergrator measures the unwanted DC offset and the R-2-R ladders and programmable to compensate for the unwanted DC offset.

* * * * *